(12) United States Patent
Nagai

(10) Patent No.: US 10,359,903 B2
(45) Date of Patent: Jul. 23, 2019

(54) METHOD OF EVALUATING AN ELECTRONIC DEVICE INVOLVING DISPLAY OF A CHARACTERISTIC PARAMETER ITEM OR A CHARACTERISTIC GRAPH ITEM IN A DATA SHEET FORMAT, APPARATUS THEREFOR, AND RECORDING MEDIUM THEREFOR

(71) Applicant: Keysight Technologies, Inc., Santa Rosa, CA (US)

(72) Inventor: Yoshimi Nagai, Tokyo (JP)

(73) Assignee: Keysight Technologies, Inc., Santa Rosa, CA (US)

( * ) Notice: Subject to any disclaimer, the term of this patent is extended or adjusted under 35 U.S.C. 154(b) by 372 days.

(21) Appl. No.: 15/097,311

(22) Filed: Apr. 13, 2016

(65) Prior Publication Data

US 2016/0320432 A1 Nov. 3, 2016

(30) Foreign Application Priority Data

Apr. 28, 2015 (JP) ................................. 2015-091442

(51) Int. Cl.
*G01R 13/00* (2006.01)
*G06F 3/0481* (2013.01)
*G06T 11/20* (2006.01)

(52) U.S. Cl.
CPC .......... *G06F 3/0481* (2013.01); *G06T 11/206* (2013.01)

(58) Field of Classification Search
CPC .... G06F 3/0481; G06F 17/5045; G06F 3/048; G06F 16/168; G06F 16/7335;
(Continued)

(56) References Cited

U.S. PATENT DOCUMENTS 9,541,472 B2 * 1/2017 Neeley ..................... G01D 7/08
2006/0129319 A1 * 6/2006 Ishizuka ............ G01R 31/2834
702/1

(Continued)

FOREIGN PATENT DOCUMENTS

JP 58-100760 A 6/1983
JP 05215807 A 8/1983
JP 2004177125 A 6/2004

OTHER PUBLICATIONS

Texas Instruments, "TPA2039D1 3.2W Mono CLass-D Audio Amplifier With 12-db Gain and Auto Short Circuit Recovery", Dec. 2009, http://www.ti.com/lit/ds/symlink/tpa2039d1.pdf.*

(Continued)

*Primary Examiner* — Shahed Ahmed

(57) ABSTRACT

Provided are a method and an apparatus that are capable of easily obtaining a data sheet including characteristics under desired operating conditions based on an actual measurement. A method of evaluating an electronic and an apparatus configured to execute the method are provided. The method includes displaying a characteristic parameter item or a characteristic graph item in a data sheet format; editing the characteristic parameter item or the characteristic graph item; and providing a button for initiating execution of a measurement of the characteristic parameter item or the characteristic graph item.

20 Claims, 11 Drawing Sheets

(58) Field of Classification Search
CPC . G06F 3/04895; G06T 11/206; G01D 5/2266; G01R 1/00; G02F 2/00; G04D 7/00
USPC .......................... 702/23, 33, 44, 57, 66, 117
See application file for complete search history.

(56) References Cited

U.S. PATENT DOCUMENTS

| | | | | |
|---|---|---|---|---|
| 2008/0288201 | A1* | 11/2008 | Oettinger | H02M 3/157 702/109 |
| 2013/0197875 | A1* | 8/2013 | Shirley | G01R 31/31718 703/2 |
| 2013/0331992 | A1* | 12/2013 | Subramaniam | G06F 19/22 700/266 |
| 2014/0137067 | A1 | 5/2014 | Duff | |
| 2014/0137069 | A1* | 5/2014 | Duff | H03H 11/1221 716/132 |
| 2014/0281595 | A1* | 9/2014 | Baker | G06F 1/30 713/300 |
| 2015/0006089 | A1* | 1/2015 | Pagels | G01N 33/487 702/19 |
| 2016/0210558 | A1* | 7/2016 | Reichinger | G06Q 10/04 |

OTHER PUBLICATIONS

Texas Instruments, "TPA2039D1 Audio Power Amplifier Evaluation Module", Sep. 2009 http://www.ti.com/lit/ug/slou269/slou269.pdf.*

Technical Information F3L400R12PT4_B26, Infineon Technologies AG, Nov. 11, 2013, pp. 1-14.

Application Note AN 2011-05 V1.2, Industrial IGBT Modules, Explanation of Technical Information, Infineon Technologies AG, Nov. 2015, pp. 1-33.

"1500 A and 10 kV IGBT Characterization Using the Agilent B1505A, Application Note B1505A Power Device Analyzer/Curve Tracer," Agilent Technologies, Inc., Jul. 27, 2012, pp. 1-10.

Japanese Office Action dated Feb. 14, 2019 with English translation, 8 pgs.

* cited by examiner

FIG.2A

METHOD OF EVALUATING AN ELECTRONIC DEVICE INVOLVING DISPLAY OF A CHARACTERISTIC PARAMETER ITEM OR A CHARACTERISTIC GRAPH ITEM IN A DATA SHEET FORMAT, APPARATUS THEREFOR, AND RECORDING MEDIUM THEREFOR

CROSS-REFERENCE TO RELATED APPLICATION

A claim for priority under 35 U.S.C. § 119 is made to Japanese Patent Application No. 2015-091442 filed on Apr. 28, 2015, in the Japanese Patent Office, the entire contents of which are hereby incorporated by reference.

BACKGROUND

A data sheet of an electronic device is a specification sheet mainly relating to electric characteristics of a device provided to a user by a device maker as disclosed in "Technical Information F3L400R12PT4_B26," Infineon Technologies AG, Nov. 11, 2013. In the data sheet, for each device type, the electric characteristics to be published are represented by numerical values or graphs, and data such as specification values are described. Furthermore, in regard to the electric characteristics, a value of a characteristic parameter and a graph of a characteristic curve (hereinafter referred to as a "characteristic graph") are described for each of various items.

More specifically, the data sheet includes a part in which specifications of maximum ratings indicating a guarantee range of an operation of the device are described and a part in which ranges of various rated values are described. These descriptive parts involve not only descriptions of the respective rated values but also descriptions of a name of each rated value, an abbreviated name thereof, a unit thereof, setting conditions therefor, that is, measurement conditions, and in some cases, at least one of a maximum value and a minimum value of the rated value. In addition, the data sheet includes a part in which graphs indicating various kinds of characteristic curves under conditions satisfying the ratings are described.

The data sheet may be used as a sales support tool for the device maker in a sense that features of the device are described in the data sheet. Furthermore, the user uses the data sheet as data to be used to select parts and design a circuit using the selected parts. Note that, in general, such a user may often be an expert in design rather than an expert in measurement.

In general, the device maker describes and publishes a simplified measurement block diagram for a measurement method used for a measurement of an electric characteristic described in the data sheet, but does not describe or publish a measurement instrument used for the measurement, control specifications thereof, or the like.

There are many more kinds of electric characteristic items described in the data sheet in a case of a semiconductor transistor, which is a three-terminal device, than in a case of an electronic component device such as a two-terminal passive element, for example, a resistor, a capacitor, or an inductor.

The device maker sometimes publishes methods of measuring the above-mentioned specification values and representative values, representative values other than those described in the data sheet, and the like for each device as such an application note as disclosed in "Application Note AN 2011-05 V1.1 May 2013, Industrial IGBT Modules, Explanation of Technical Information," Infineon Technologies AG, May 5, 2013.

As described above, the data sheet and the application note allow a maker to provide the specification values and the representative values, but do not necessarily indicate performance of the device based on values actually measured under conditions desired by the user.

However, when the user of the electronic device, in particular, a circuit designer in this case, wishes to design an intended circuit, the user is required to acquire the characteristics of the device under operating conditions for the circuit to be used. To that end, the user is required to understand details of the data sheet and the application note and to create a measurement environment and a measurement program while paying attention to the measurement conditions at the same time, which requires large amounts of labor, time, and cost. Furthermore, when the user manages measurement results obtained for each device type for easy reference and puts the measurement results to use for the user's own design, much labor is required to sort and manage the measurement results by the device type, rearrange the accumulated measurement results for easy access, and present the measurement results in a form that allows easy understanding (readability), which imposes a considerable burden on the user.

In order to solve the above-mentioned problems, a device analyzer disclosed in, for example, "1500 A and 10 kV IGBT Characterization Using the Agilent B1505A, Application Note B1505A Power Device Analyzer/Curve Tracer," Agilent Technologies, Inc., Jul. 27, 2012 may be used. Through use of software EasyEXPERT shown in FIG. 6 of "1500 A and 10 kV IGBT Characterization Using the Agilent B1505A, Application Note B1505A Power Device Analyzer/Curve Tracer," Agilent Technologies, Inc., Jul. 27, 2012, various electric characteristics of a semiconductor device may be measured and analyzed to extract characteristic parameters with a Keysight B1505A device analyzer sold by Keysight Technologies, Inc. (formerly Agilent Technologies, Inc.). In addition, the characteristic curve may be converted into a graph. In addition, multiple measurements may be automatically executed.

However, the following problems arise even when the above-mentioned analyzer allows the measurement of the individual characteristics described in the data sheet of the device.

First, a typical user as described above is familiar with representation of the various characteristics in a data sheet format as disclosed in "Technical Information F3L400R12PT4_B26," Infineon Technologies AG, Nov. 11, 2013, but is not an expert in measurement of device characteristics. Therefore, the user is not familiar with a specific method of measuring each characteristic, a setting method unique to the measurement instrument required to carry out the method, or other such method, and thus is required to learn and understand those methods. Therefore, such a user has difficulty performing the setting of and the measurement with the measurement instrument under desired device operating conditions so as to obtain the device characteristics. Through the use of the software EasyEXPERT shown in FIGS. 6 of "1500 A and 10 kV IGBT Characterization Using the Agilent B1505A, Application Note B1505A Power Device Analyzer/Curve Tracer," Agilent Technologies, Inc., Jul. 27, 2012, the characteristics of the semiconductor device may be measured with a desired setting. However, to use this software, the user is required to conduct various settings necessary for the measurement instrument to be used for the measurement in addition to the measurement conditions described in the data sheet, which imposes a burden on the user.

Next, when multiple measurements are conducted by EasyEXPERT described above, the respective measurement results are stored in individual files or stored in one file in a list structure or a tree structure, but such a structure is not a data sheet format. Therefore, such measurement results lack browsability, and are hard for the user to grasp. On the other hand, to individually read a measurement result from among the stored measurement results to provide the representation of the characteristics in the data sheet format, the user is required to conduct work for selection of the measurement result and creation of a report, which takes labor, time, and cost.

In addition, in the above-mentioned case, when there is need to further acquire characteristics under different operating conditions as a result of reviewing the representation of the characteristics obtained as a result of creating the report, the user is required to again conduct work for the measurement of the respective characteristics, the selection of the measurement result, and the creation of the report, which imposes a heavy burden on the user.

As described above, the user obtains information on the characteristics of a device from the data sheet provided by the device maker, to compare the characteristics among multiple types and design and simulate the circuit into which the device is built, but the data sheet does not always include the descriptions of all the characteristics for the comparison or all the characteristics under the operating conditions required for the design.

In addition, most users are not familiar with the specific method of measuring each characteristic described in the data sheet. Furthermore, the method differs depending on the measurement instrument, and hence when the data sheet provided by the device maker does not include the description of a characteristic under desired operating conditions, the user of the device has difficulty performing the measurement to know the characteristic of the device.

In addition, even when the user takes time to perform the measurement, there exists no measurement instrument that has a function of displaying the representation of characteristics as described in the data sheet, and hence the user is required to extract multiple measurement results and graphs from the measurement instrument, and to prepare a report involving the representation of characteristics using software such as a word processor on a personal computer (PC).

SUMMARY

An evaluation method is provided that allows a measurement condition for a characteristic parameter to be set and a measurement result to be acquired with a desired setting, for a device to be measured with a data sheet format displayed from the beginning, and further allows a measurement condition for a characteristic graph to be set and a measurement result to be acquired with a desired setting; an apparatus therefor; and a recording medium therefor.

Accordingly, the various embodiments are useful particularly for a user of the device or the like who is familiar with representation of characteristics in the data sheet format, and allows the device to be evaluated more efficiently.

A method of evaluating an electronic device according to an embodiment includes displaying at least one characteristic parameter item or at least one characteristic graph item in a data sheet format; editing the at least one characteristic parameter item or the at least one characteristic graph item; and providing a button for initiating execution of a measurement of the at least one characteristic parameter item or the at least one characteristic graph item.

Furthermore, the method includes an aspect of further including executing the measurement of the at least one characteristic parameter item or the at least one characteristic graph item, and an aspect of further including displaying a measurement result for the at least one characteristic parameter item or the at least one characteristic graph item in the data sheet format.

Furthermore, the method includes an aspect in which the at least one characteristic parameter item to be displayed in the data sheet format includes a name for identifying the at least one characteristic parameter item; at least one measurement condition for the at least one characteristic parameter item; and a characteristic parameter value of the at least one characteristic parameter item, or in which the at least one characteristic graph item to be displayed in the data sheet format includes a name for identifying a characteristic graph of the at least one characteristic graph item; at least one measurement condition for the at least one characteristic graph item; and display of the characteristic graph of the at least one characteristic graph item. The method also includes an aspect in which the displaying at least one characteristic parameter item or at least one characteristic graph item in a data sheet format includes displaying a predetermined sample value as a parameter value of the at least one characteristic parameter item; or displaying a predetermined sample graph as display of the at least one characteristic graph item. The method also includes an aspect in which one of the display of the predetermined sample value and the display of the predetermined sample graph includes display for promoting a user's understanding of details of the execution of the measurement of the at least one characteristic parameter item or the at least one characteristic graph item without the execution of the measurement.

An apparatus for evaluating an electronic device according to an embodiment includes a measurement unit including multiple measurement modules; a connection unit configured to establish a connection between the electronic device and at least one of the plurality of measurement modules; a controller configured to control display including a characteristic parameter display section for displaying at least one characteristic parameter item in a data sheet format or a characteristic graph display section for displaying at least one characteristic graph item in the data sheet format; to edit details of the displayed characteristic parameter display section or the displayed characteristic graph display section; to execute a measurement based on the details; and to display a result of the measurement in the characteristic parameter display section or the characteristic graph display section in the data sheet format; and a display configured to display the characteristic parameter display section or the characteristic graph display section.

Furthermore, the apparatus includes an aspect in which the at least one characteristic parameter item to be displayed in the data sheet format includes: a name for identifying a characteristic parameter corresponding to the at least one characteristic parameter item; at least one measurement condition for the characteristic parameter; and a value of the characteristic parameter, or in which the at least one characteristic graph item to be displayed in the data sheet format includes: a name for identifying a characteristic graph corresponding to the at least one characteristic graph item; at least one measurement condition for the characteristic graph; and display of the characteristic graph.

Furthermore, the apparatus includes an aspect in which one of the characteristic parameter display section and the characteristic graph display section displays, before the execution of the measurement, comprises: a predetermined sample value as a parameter value of the at least one characteristic parameter item; or a predetermined sample graph as display of the at least one characteristic graph item. The apparatus includes an aspect in which the plurality of measurement modules of the measurement unit include at least one of a voltage source, a current source, an ammeter, a voltmeter, a source measure unit, an impedance meter, and a capacitance meter.

A tangible, computer-readable recording medium according to an embodiment causes a computer to execute software and/or instructions to perform a method including: displaying at least one characteristic parameter item or at least one characteristic graph item in a data sheet format; editing the at least one characteristic parameter item or the at least one characteristic graph item displayed in the data sheet format; and providing a button for initiating a measurement of the at least one characteristic parameter item or the at least one characteristic graph item.

Accordingly, the user is able to interactively obtain, as a result described in the data sheet format, the measured value or the characteristic of a target device with the desired setting relating to the circuit to be designed by himself/herself by executing at least one of addition, editing, and measurement of an item on the above-mentioned software, and to obtain the evaluation results for the device, that is, the measurement results for the characteristics of the device, which are useful for circuit design, with efficiency and with ease.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 2A is a view for showing a detailed structure of a screen according to a representative embodiment.

DETAILED DESCRIPTION

In the following detailed description, for purposes of explanation and not limitation, illustrative embodiments of the invention disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Figure 1:
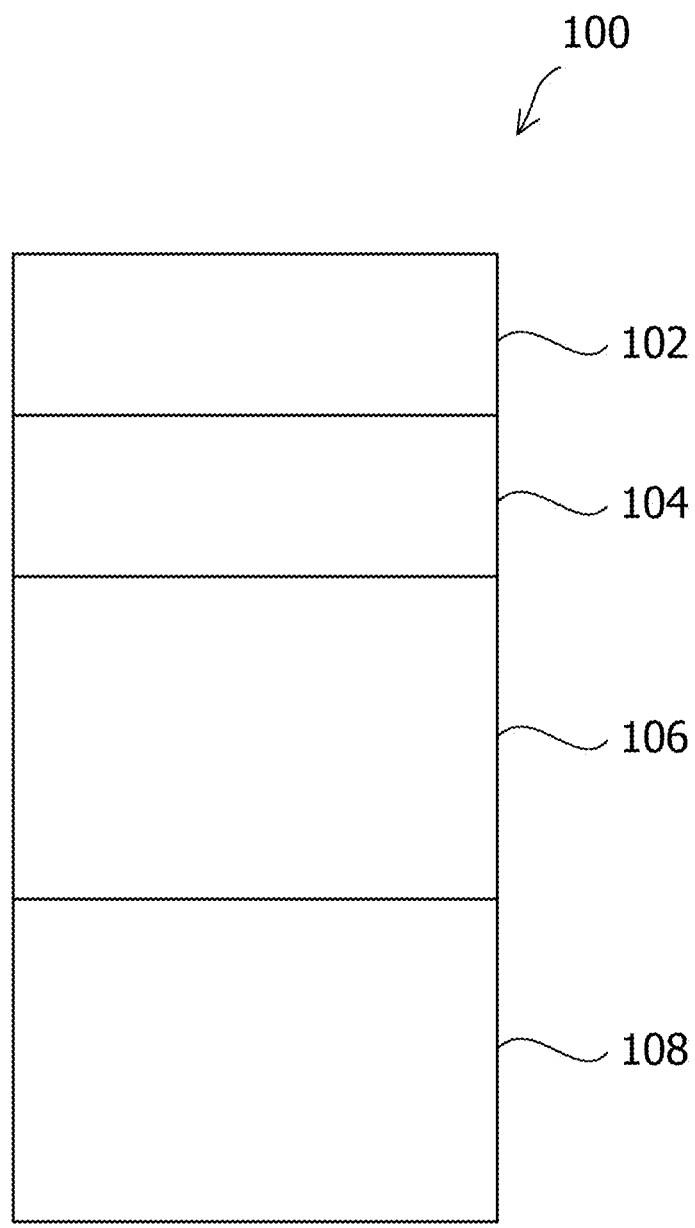
FIG. 1 is a diagram for illustrating a schematic structure of a screen according to a representative embodiment.
Figure 2A:
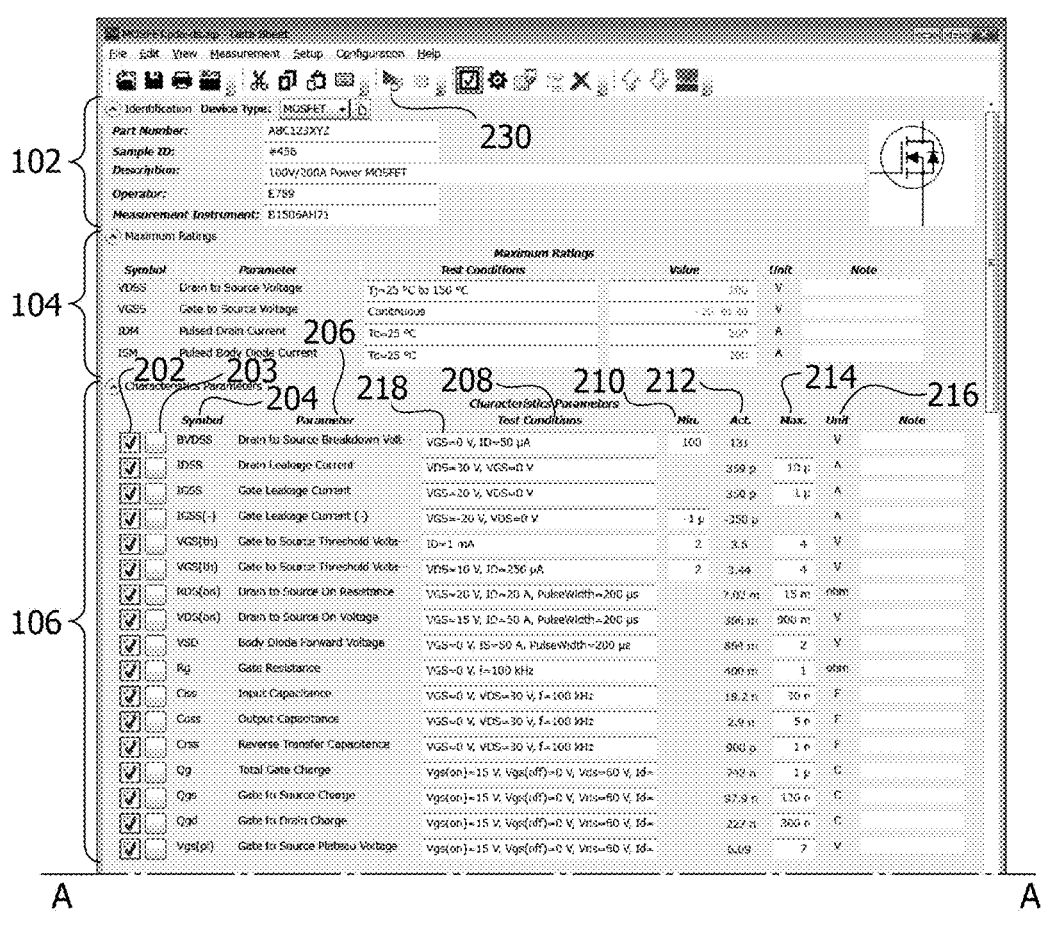
Figure 2B:
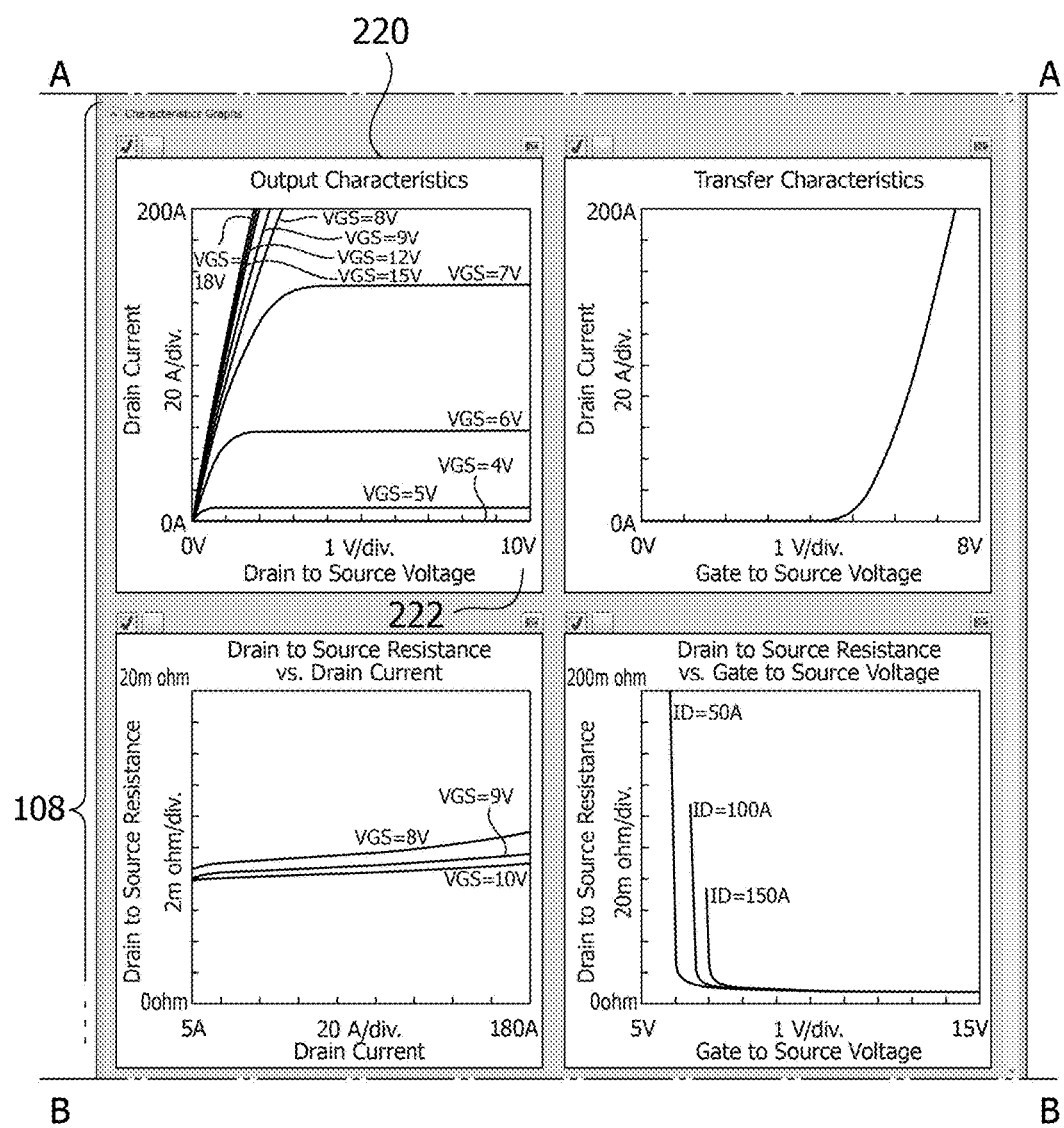
FIG. 2B is a view for showing a detailed structure of a screen according to a representative embodiment.
Figure 2C:
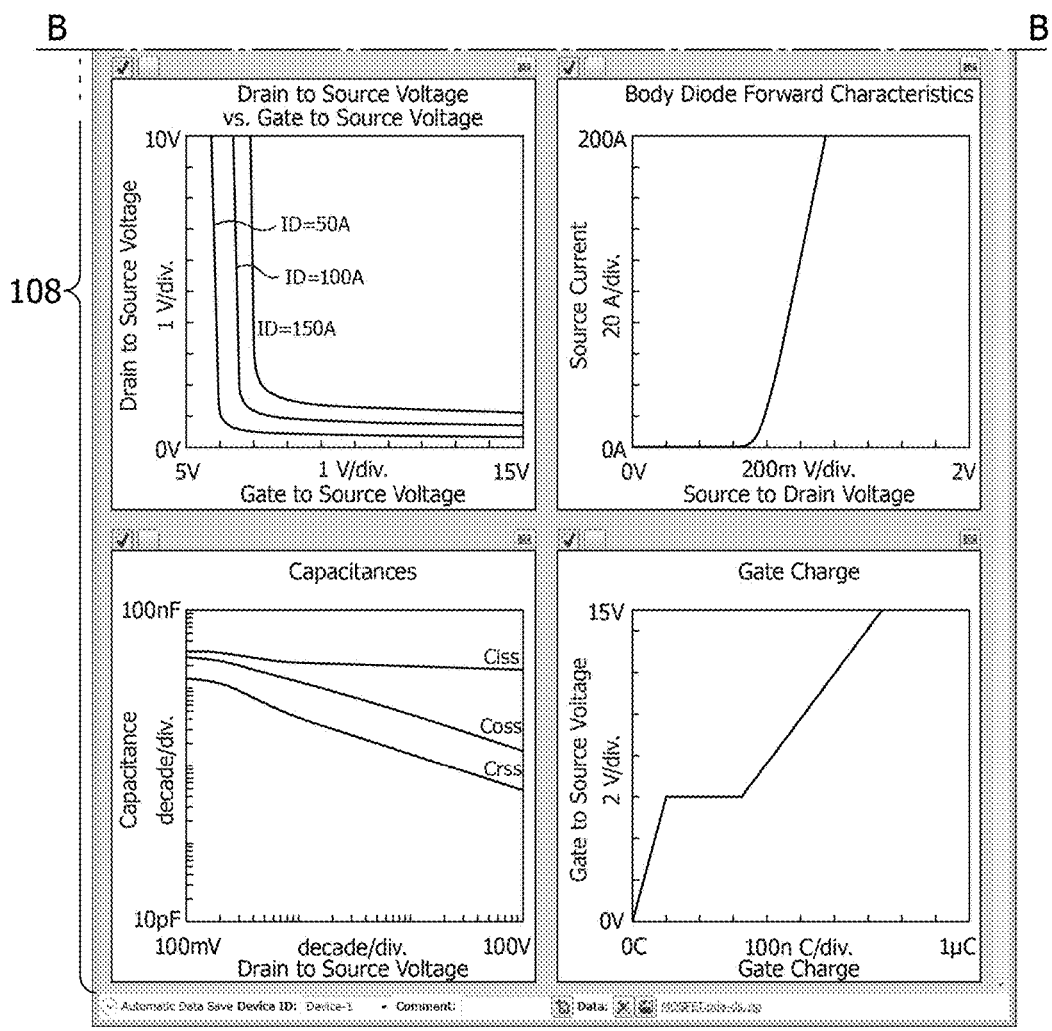
FIG. 2C is a view for showing a detailed structure of a screen according to a representative embodiment.

An outline of a screen 100, or graphical user interface (GUI), used for a method of evaluating a device involving display in a data sheet format or an apparatus therefor according to an embodiment of the present invention is illustrated in FIG. 1, and details of the screen 100 are shown in FIG. 2A, FIG. 2B, and FIG. 2C, according to a representative embodiment.

As illustrated in FIG. 1, or as shown in FIG. 2A, FIG. 2B, and FIG. 2C by being split by the A-A line or the B-B line, the screen 100 includes four display sections, that is, a device identification information display section 102, a maximum rating display section 104, a characteristic parameter display section 106, and a characteristic graph display section 108 (hereinafter also referred to simply as "display sections 102, 104, 106, and 108," respectively).

The device identification information display section 102 may be used, for example, as a part for recording a model number ("Part Number" of FIG. 2A) and an individual identification information ("Sample ID" of FIG. 2A) of a device to be measured. A circuit symbol of the device to be measured is also displayed in the part. In addition, in the same manner as in a data sheet published by a maker, the circuit symbol and a description of the device may be specified or described. In addition, information on a person who performed the measurement and a measurement instrument used for the measurement may be described.

The maximum rating display section 104 enable a maximum rated value of the device to be input and displayed. The maximum rated value input to the maximum rating display section 104 is capable of serving as a limit to a measurement condition setting item at a time of measuring the device to be measured, and the embodiment may also be configured so that the limit is used to prevent the device to be measured from being destroyed due to a given stimulus that exceeds the rating.

The characteristic parameter display section 106 is an area for setting a measurement condition for a characteristic parameter based on a setting condition desired by a user and displaying a measurement result thereof as a numerical value or a range of the numerical value. In the characteristic parameter display section 106, as shown in FIG. 2A, for example, each of at least one characteristic parameter item is provided with parts for displaying a symbol (column 204 "Symbol") of each item, a parameter name (column 206

"Parameter"), the measurement condition or the setting condition (column 208 "Test Conditions"), a physical unit (column 216 "Unit") of a parameter value, a range of the parameter value (at least one boundary value such as column 210 "Min." and column 214 "Max.") that can be assumed by a non-defective device, and the parameter value (column 212 "Act.") actually obtained in the measurement. Note that, the columns 210 and 214 may be omitted when there is no need for the display. In addition, a column 202 is a column in which checkboxes for selecting execution of measurements of the characteristic parameter items in the corresponding rows are arranged, and a column 203 is a column in which buttons for displaying and specifying priorities in an execution order of the measurements of the characteristic parameter items are arranged.

The characteristic graph display section 108 is an area for setting a measurement condition for a characteristic graph based on a setting condition desired by a user and displaying a measurement result thereof as a graph of a characteristic curve. The characteristic graph display section 108 is a part for displaying at least one characteristic graph indicating an item name of the characteristic graph, a name of a measurand of each graph axis, a physical unit of the measurand, a range of the graph axis, and a characteristic in a format of an X-Y graph (FIG. 2B and FIG. 2C). In the graph, when multiple characteristic curves of different conditions are displayed, a condition for each of the characteristic curves is allowed to be displayed. Furthermore, each axis is allowed to be displayed in a linear scale or a logarithmic scale.

It should be noted that boxes having the same functions as those of the columns 202 and 203 within the characteristic parameter display section 106 is arranged in a top left part of each graph within the characteristic graph display section 108.

In FIG. 2A, a button 230 among buttons of a command menu displayed above the device identification information display section 102 is provided as a button for initiating (that is, providing instruction(s) to initiate) execution of the measurement. When the button 230 is clicked, the characteristic parameter item selected in the characteristic parameter display section 106 and the characteristic graph item selected in the characteristic graph display section 108 are executed in an order based on the specified priorities. Note that, the button 230 is merely an example of a component for triggering the instruction for the execution of the measurement, and the embodiment may be configured so that a measurement unit may be instructed to execute the measurement through a menu in another form, a button in another form, or the like.

The respective display sections 102, 104, 106, and 108 of the screen 100 according to the above-mentioned illustrative embodiment are arranged as shown in FIG. 2A, FIG. 2B, and FIG. 2C, and may be configured to be displayed by being scrolled vertically, for example.

Note that, the screen 100 used for a method of evaluating the device in the data sheet format or the apparatus therefor according to the embodiment of the present invention may be configured to include at least one of the characteristic parameter display section 106 and the characteristic graph display section 108.

Figure 3:
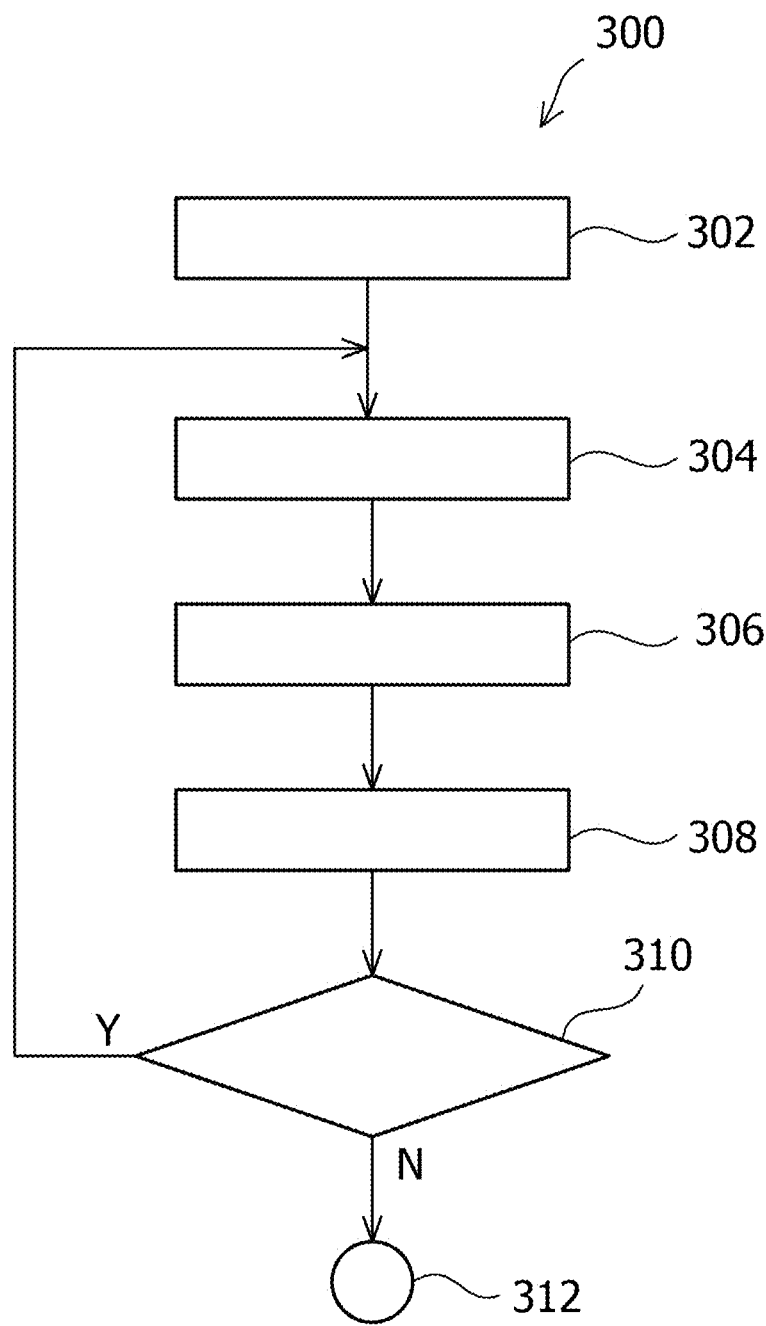
FIG. 3 is a flowchart for illustrating an operation according to a representative embodiment.

Next, a flowchart 300 for the method and the apparatus according to the representative embodiment is illustrated in FIG. 3. Referring to FIG. 3, in Step 302, an initial screen (described in detail, below) is displayed, where the initial screen has the data sheet format corresponding to a selected device type.

In Step 304, the details displayed in the display sections 102, 104, 106, and 108 are input and/or edited. Note that, an operation for the editing may include not only inputting of a value or a character string into a field on the screen, but also an operation for replicating or deleting an item to be displayed in the characteristic parameter display section 106 or the characteristic graph display section 108. Notably, prior to the execution of the measurement, Step 302 or Step 304 may include providing a button on the screen for initiating the execution of the measurement.

In Step 306, the measurement of each item is executed based on the items and the setting conditions that are displayed in the characteristic parameter display section 106 and/or the characteristic graph display section 108. Note that, according to the depicted embodiment, in Step 306, at least one of the characteristic parameter display section 106 and the characteristic graph display section 108 may be displayed, and the measurement is may be conducted under the displayed conditions.

In Step 308, the characteristic parameter value and/or the characteristic graph are updated, based on the measurement results, to be displayed on the screen 100 in the above-mentioned data sheet format. Note that, in Step 308, the details displayed on the screen 100 may be printed as necessary.

In Step 310, a determination is made as to whether or not an iteration of performing Step 304 through Step 308 is necessary. When another iteration is necessary, the procedure returns to Step 304, and when another iteration is not necessary, the procedure advances to Step 312, ending the process.

Figure 4:
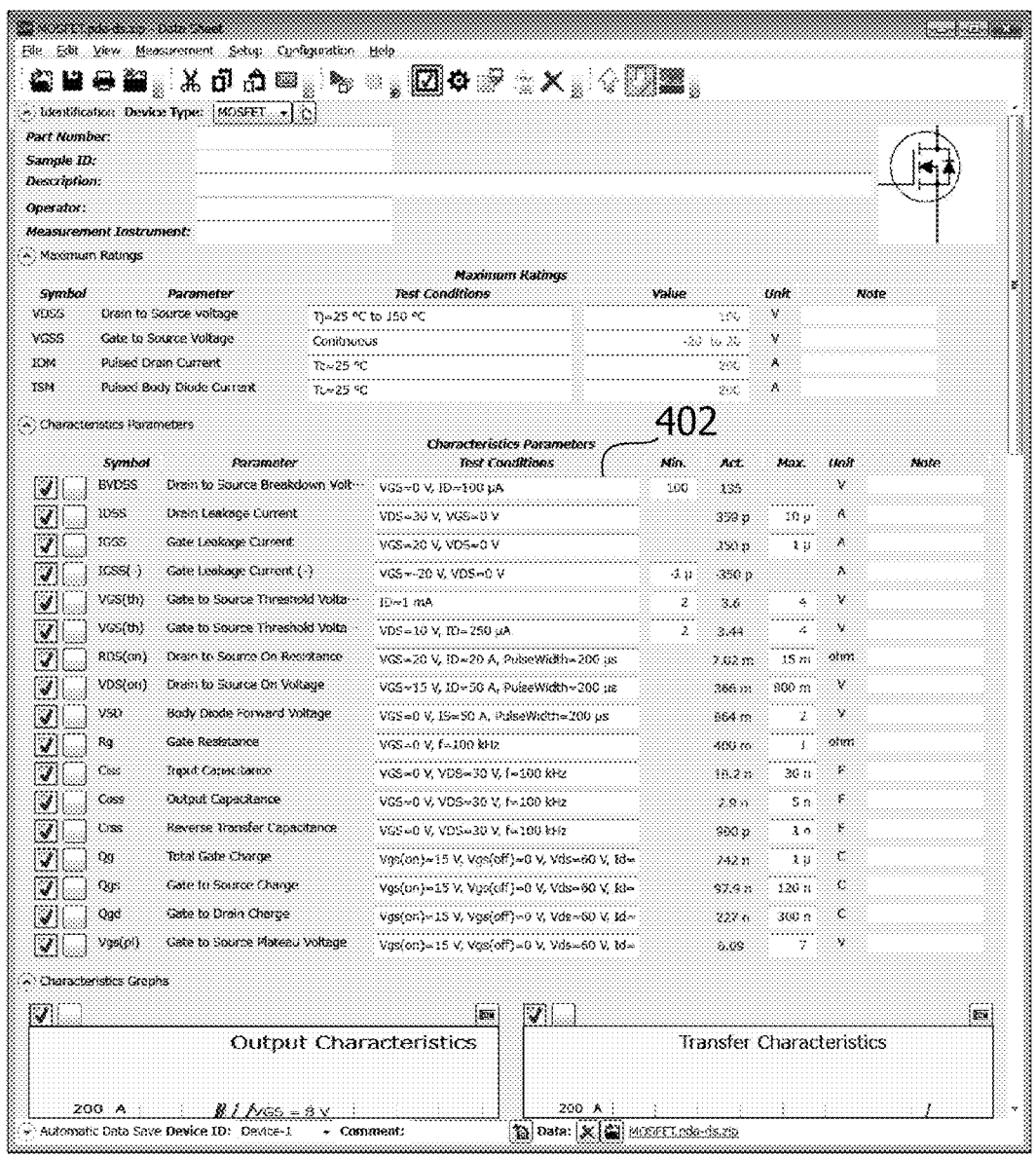
FIG. 4 is a view for showing an initial screen displayed in Step 302 of FIG. 3.

Note that, in Step 302, an initial screen as shown in FIG. 4, for example, may be displayed. As the initial screen, one template is selected, e.g., from templates stored in a computer memory, for example, such as a read only memory (ROM) or a random access memory (RAM), based on the type of the device selected by the user from among templates in the data sheet format for respective devices that are provided for this embodiment and the selected template is displayed. This is possible because, even though characteristic items described in the data sheet as a publication differ depending on a kind of device, such as a MOSFET, an IGBT, or a diode, for example, that is, a difference in the device type, the characteristic items for the same device type are described in the data sheet in approximately the same manner among different device makers. The following should be understood in comparison of FIG. 4 against FIG. 2A and FIG. 2B. That is, in the device identification information display section 102 of the initial screen shown in FIG. 4, only the circuit symbol of the selected type of the device is displayed, and the fields for recording the model number of the device to be measured and the individual identification information are blank, and thus are allowed to be input by the user in Step 304.

Furthermore, in the maximum rating display section 104, a value of a sample corresponding to the device of this example and a condition therefor, which are provided for this embodiment, are displayed.

In addition, in the characteristic parameter display section 106, multiple characteristic parameter items corresponding to the device of this example, which are provided for this illustrative embodiment, are each displayed with a setting condition for each item, a measurement result or an expected measurement result of the sample, a range of the parameter value of the sample, and the like, and are set with check marks so that the measurements of all the items are to be executed.

In addition, in the characteristic graph display section 108, multiple characteristic graph items corresponding to the device of this example, which are provided for this illustrative embodiment, are each displayed with a setting of each axis of the graph regarding each item, the characteristic graph of the sample, and the like, and are set with check marks so that all the items are to be measured as measurement targets. Note that, in FIG. 4, only top parts of the first two items ("Output Characteristics" and "Transfer Characteristics") of the multiple characteristic graph items shown in FIG. 2B are shown for purposes of illustration.

It should be noted that when the characteristic parameter items are displayed on the above-mentioned initial screen, the measured values are displayed as sample values in advance to facilitate the user's understanding (column "Act." in FIG. 4).

Figure 5:
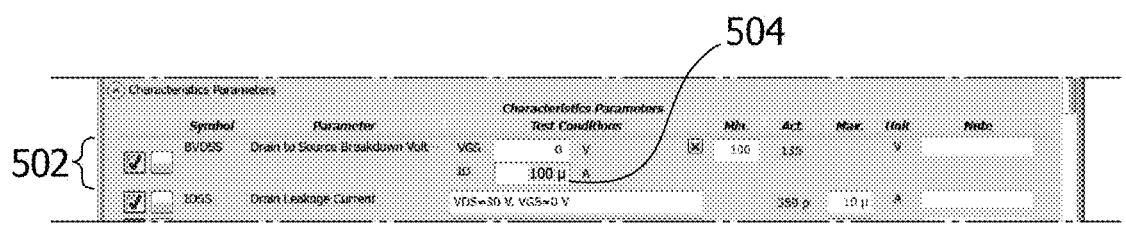
FIG. 5 is a view for showing a part of a screen to be displayed when setting conditions for characteristic parameter items are edited in FIG. 2A.

In addition, as an example of editing the characteristic parameter display section 106 in Step 304, a method of changing a specific setting condition is described. An example of changing a setting of an ID within a field 402 of the measurement conditions ("Test Conditions") for BVDSS on an initial setting screen shown in FIG. 4 from 100 µA to 50 µA is described. The user moves a mouse pointer, for example, onto the field 402 and left clicks in order to edit the field 402 of FIG. 4, shown in FIG. 5 as two-line display 502, causing the display regarding BVDSS to enter an edit mode in the fields that can be updated for the respective parameters within which the measurement condition fields are displayed. Subsequently, the user may move the mouse pointer onto a field 504 and left click, which causes the field 504 to be highlighted, indicating the field 504 has entered an edit mode, which allows the setting value regarding the ID to be changed. A result of thus changing the setting value of the ID of BVDSS to 50 µA is shown in the field 218 of FIG. 2A.

Figure 6:
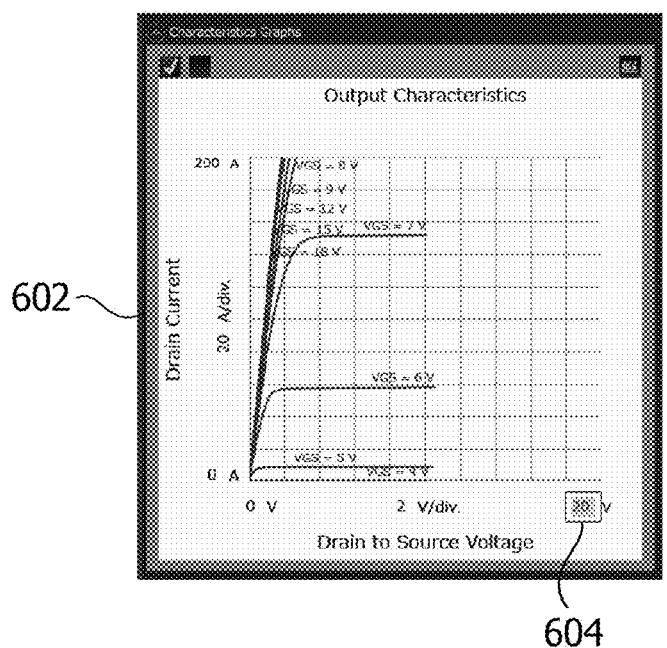
FIG. 6 is a view for showing a part of a screen for editing setting conditions for a characteristic graph item in FIG. 2B.

In addition, as an example of editing the characteristic graph display section 108 in Step 304, a method of changing an upper limit of display of a physical quantity in an X-axis of the graph is described. When the user scrolls down the display of FIG. 4 to display an entirety of a characteristic graph 602 of "Output Characteristics," for example, as a part of the screen shown in FIG. 6, and moves the mouse pointer onto a display part of the upper limit of the X-axis and makes a left click, a field 604 of FIG. 6 appears, enabling the user to edit a value within the field. A result of changing the value of the field of an upper limit value of Drain to Source Voltage in the X-axis to 10 V is shown in a field 222 in FIG. 2B. Note that, editing methods according to various embodiments are not limited to the illustrative screens of FIG. 5 and FIG. 6, and may be obtained by combining known methods.

In addition, in Step 304, for each of the characteristic parameter items and the characteristic graph items that are displayed, the buttons in the column 202 enable the selection for executing the measurement, and the buttons in the column 203 enable the specification of priority for executing the measurement.

In addition, as an example of editing the characteristic parameter display section 106 in Step 304, a method of changing and adding a setting condition for a specific characteristic parameter item is described. When the user moves the mouse pointer onto an item 702 of RDS(on) of FIG. 7 and makes a right click with a mouse, for example, a corresponding menu 710 is displayed. Subsequently, when the user selects the menu item of "Duplicate," for example, on the menu 710, a new item of RDS(on) is replicated between display of the item 702 of RDS(on) and display of an item 704 of VDS(on), and is displayed in the edit mode similar to that of FIG. 5. Such a method as described above allows the symbol, the parameter name, the measurement condition, and the like to be changed, to add a new item.

Note that, in the above-mentioned operation, selection of a menu item of "Delete" on the menu 710 enables the corresponding item to be deleted.

In addition, when the user moves the mouse pointer onto a desired graph in the characteristic graph display section 108 and to make a right click with the mouse, for example, the above-mentioned menu 710 is displayed. The same operations as those described above are allowed to be selected from the displayed menu 710.

In addition, in Step 304 of FIG. 3, for the measurement condition for each item displayed in the characteristic parameter display section 106 or the characteristic graph display section 108 (e.g., FIG. 2A, FIG. 2B, and FIG. 2C), the following operation allows a more detailed measurement condition that is not displayed in the display section 106 or 108 to be set. That is, according to this embodiment, through change of a setting of a measurement module at a deeper level in the following manner than that of the settable measurement conditions provided only by the display of the above-mentioned display section 106 or 108, the user is able to conduct a setting at a level closer to that of hardware or a setting unique to the measurement instrument as necessary while usually allowing the user to view only main measurement conditions.

Figures 7, 8:
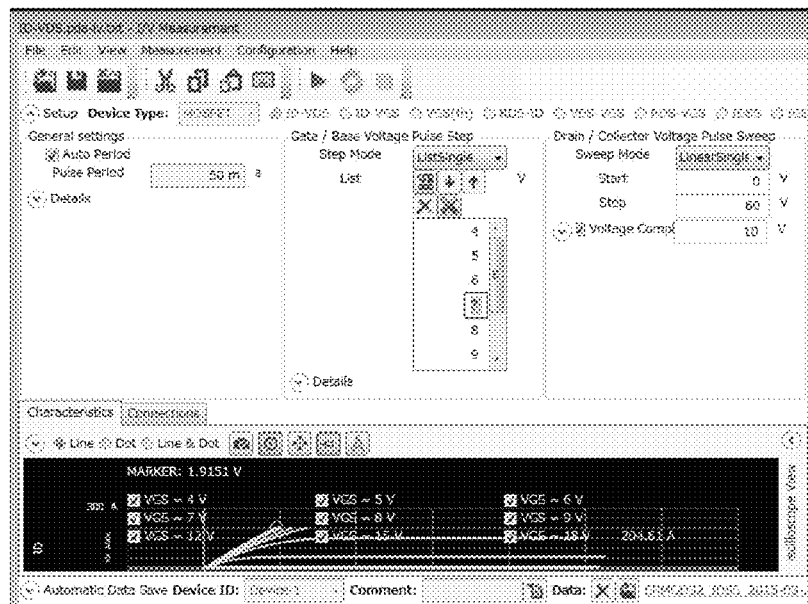
FIG. 7 is a view for showing a part of a screen for an operation for duplicating the characteristic parameter item in FIG. 2A.
FIG. 8 is a view for showing a setting screen having a lower abstraction degree in regard to one of the characteristic graph items shown in FIG. 2B.

First, the user makes a right click with the mouse on a desired item shown in FIG. 2A, FIG. 2B, and FIG. 2C, for example, to display the corresponding above-mentioned menu 710 shown in FIG. 7, and selects "Setup" on the menu. This allows, for example, a screen such as a window 802 shown in FIG. 8 to be open, the screen allowing the user to set various kinds of measurement conditions regarding a measurement program at a level closer to that of the measurement module for a specific measurement parameter item or a specific measurement graph item. Note that, the window 802 shown in FIG. 8 is a window regarding the measurement program (in this example, current/voltage measurement (I/V measurement)) at the level closer to that of the measurement module in regard to the graph 220 of "Output Characteristics" shown in FIG. 2B, and is configured to allow various kinds of measurement conditions to be set while being split into screens of "General settings," "Details," and the like or split into tabs of "Characteristics," "Connections," and the like.

Note that, the window 802 shown in FIG. 8 is described by taking an example of a specific item in the characteristic graph display section 108, but may be operated by using the menu 710 in the same manner for any one of the items in the characteristic parameter display section 106, without departing from the scope of the present teachings.

Furthermore, again with reference to FIG. 3, in Step 304, data on the screen in display or data on the screen after the editing may be stored. In addition, data that was saved in the past after the creation or the measurement may be read.

Subsequently, in Step 306, when the user clicks the button 230 for initiating the execution of the measurement, which is shown in FIG. 2A, the measurements of the selected characteristic parameter items and the selected characteristic graph items are executed in an order based on the specified priorities, discussed above, and in Step 308, the display of FIG. 2A, FIG. 2B, and FIG. 2C is updated so as to reflect the measurement results.

Note that, in Step 308, when the characteristic parameter value (column 212 in FIG. 2A) obtained in the measurement does not fall within the range indicated by the columns 210 and 214, that is, when the characteristic parameter value is not a value that can be assumed by a non-defective device, the value displayed in the column 212 may be highlighted by changing a font and/or coloring characters, for example. In addition, also in Step 308, data displayed on the screen including the measurement result may be stored.

A block diagram of an apparatus 1000 according to a representative embodiment is described with reference to FIG. 9, although the apparatus for which the various embodiments are performed is not limited thereto.

The apparatus 1000 includes a connection unit 1026 for connecting to a device under test (DUT) 1028, a measurement unit 1024, and a controller 1022. The measurement unit 1024 is mounted with at least one measurement module for executing a measurement. The connection unit 1026 establishes a connection between the DUT 1028 and the at least one measurement module within the measurement unit 1024. The controller 1022 controls operations of the connection unit 1026 and the measurement unit 1024.

The controller 1022 includes a processor 1034 and a memory 1036 connected to the processor 1034, and possesses arithmetic capability. Other controllers interfaces described herein may likewise include a corresponding processor and/or memory as described below with reference to the controller 1022.

In addition, the controller 1022 may be connected to an input device 1032 such as a keyboard or a mouse and an output device 1030 such as a display screen or a printer. The input device 1032 receives input from the user, for example, to operate the apparatus 1000. The input device 1032 and the output device 1030 communicate with the controller 1022 through corresponding input and output interfaces, respectively.

Under control of the controller 1022, the DUT 1028 is connected to a desired measurement module within the measurement unit 1024 through the connection unit 1026, and establishes a connection necessary for the measurement.

In various embodiments, the processor 1034 may include a commercially available processor, an embedded processor, an application specific integrated circuit (ASIC), a programmable logic device (PLD), a field-programmable gate array (FPGA), or the like, or combinations thereof, using software, firmware, hard-wired logic circuits, or combinations thereof. A computer processor, in particular, may be constructed of any combination of hardware, firmware or software architectures, and may include memory (e.g., volatile and/or nonvolatile memory) for storing executable software/firmware executable code that allows it to perform the various functions. In an embodiment, the processor may comprise a central processing unit (CPU), for example, executing an operating system.

In various embodiments, the memory 1036 may include various types of non-transitory memory, including a read-only memory (ROM), an erasable programmable read-only memory (EPROM), an electrically erasable programmable read-only memory (EEPROM), a random access memory (RAM), a flash memory, or other such nonvolatile memory or volatile memory, although the embodiments are not limited thereto. The memory 1036 is capable of storing a program to be executed by the processor 1034 and data to be used by the program. In addition, the memory 1036 may include a storage device such as a hard disk drive (HDD), a floppy disk drive (FDD), a CD drive that supports various CDs, a DVD drive that supports various DVDs, and/or a Blu-ray disc drive that supports various Blu-ray discs.

The controller 1022 may be implemented as a computer mounted to the measurement instrument. Furthermore, the controller 1022 may be implemented as a controller dedicated to an electronic measurement provided with a slot for the measurement unit 1024 or a computer dedicated to an electronic measurement. In addition, the controller 1022 may be implemented as a commercially available computer that is connected to a rack or a bay corresponding to the measurement unit 1024 and on which an OS such as Windows 8.1 manufactured by Microsoft Corporation, for example, or other such OS is installed.

In the depicted embodiment, the measurement unit 1024 may be configured to include one or more measurement modules. Each measurement module may be implemented as a voltage source, a current source, an ammeter, or a voltmeter, and may have a plurality of channels. Further, the measurement unit 1024 may accommodate various types of measurement modules, such as a source measure unit (SMU) 1002, 1004, a capacitance measure unit (CMU) 1006, 1008, or some other type, indicated generally by measurement module 1012. The SMU 1002, 1004 has functions of the voltage source, the current source, the ammeter, and the voltmeter, and is allowed to have a plurality of channels. Furthermore, the measurement module may be implemented as an impedance meter or an impedance analyzer, and is allowed to have a plurality of channels. Furthermore, the measurement module may be implemented as a capacitance meter capable of measuring a capacitance, or the CMU 1006, 1008 mounted to a device analyzer disclosed in, for example, "1500 A and 10 kV IGBT Characterization Using the Agilent B1505A, Application Note B1505A Power Device Analyzer/Curve Tracer," Agilent Technologies, Inc., Jul. 27, 2012, and is allowed to have a plurality of channels. The other measurement module 1012 may be configured to measure other such physical quantit (ies), and is allowed to have a plurality of channels. For example, the apparatus 1000 may be implemented as a device analyzer including a measurement unit 1024 having an SMU or a CMU.

Figure 9:
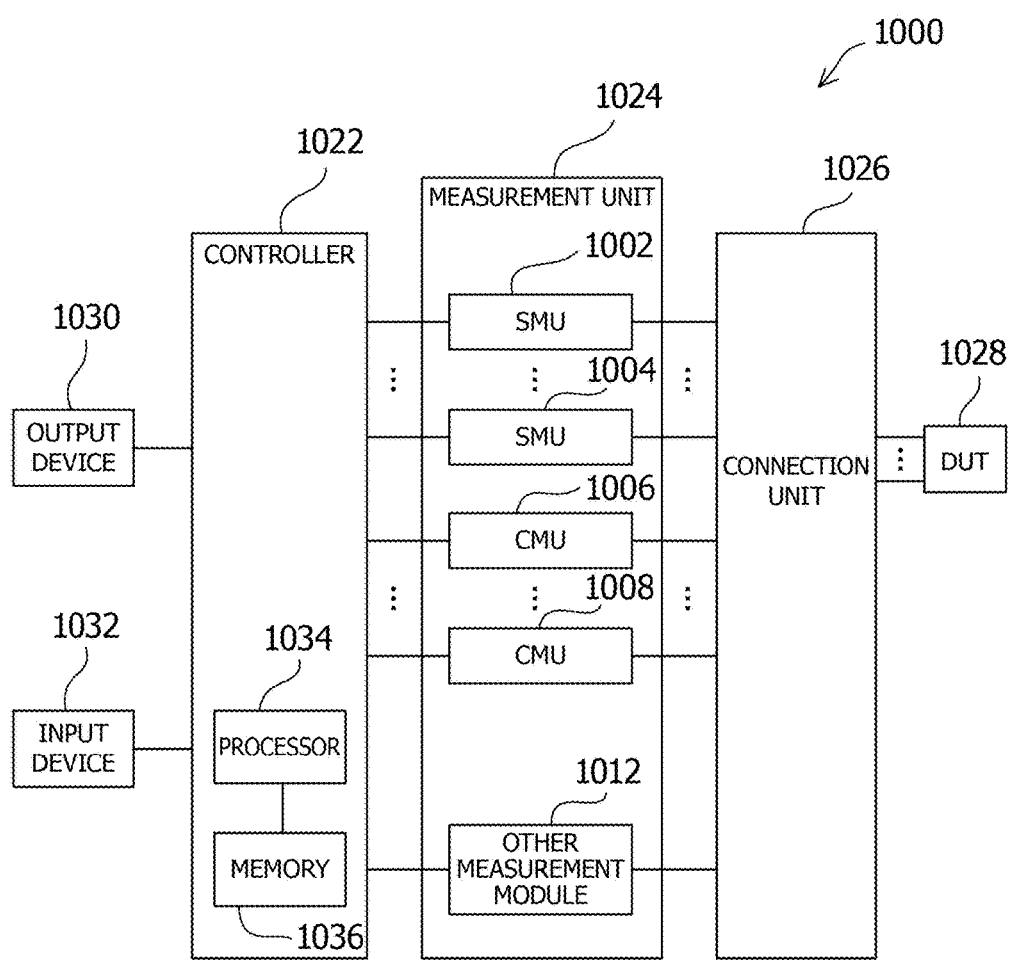
FIG. 9 is a block diagram of an apparatus according to a representative embodiment.

Next, a block diagram for illustrating control conducted when the flowchart of FIG. 3 is executed by the apparatus 1000 of FIG. 9 is described with reference to FIG. 10.

Figure 10:
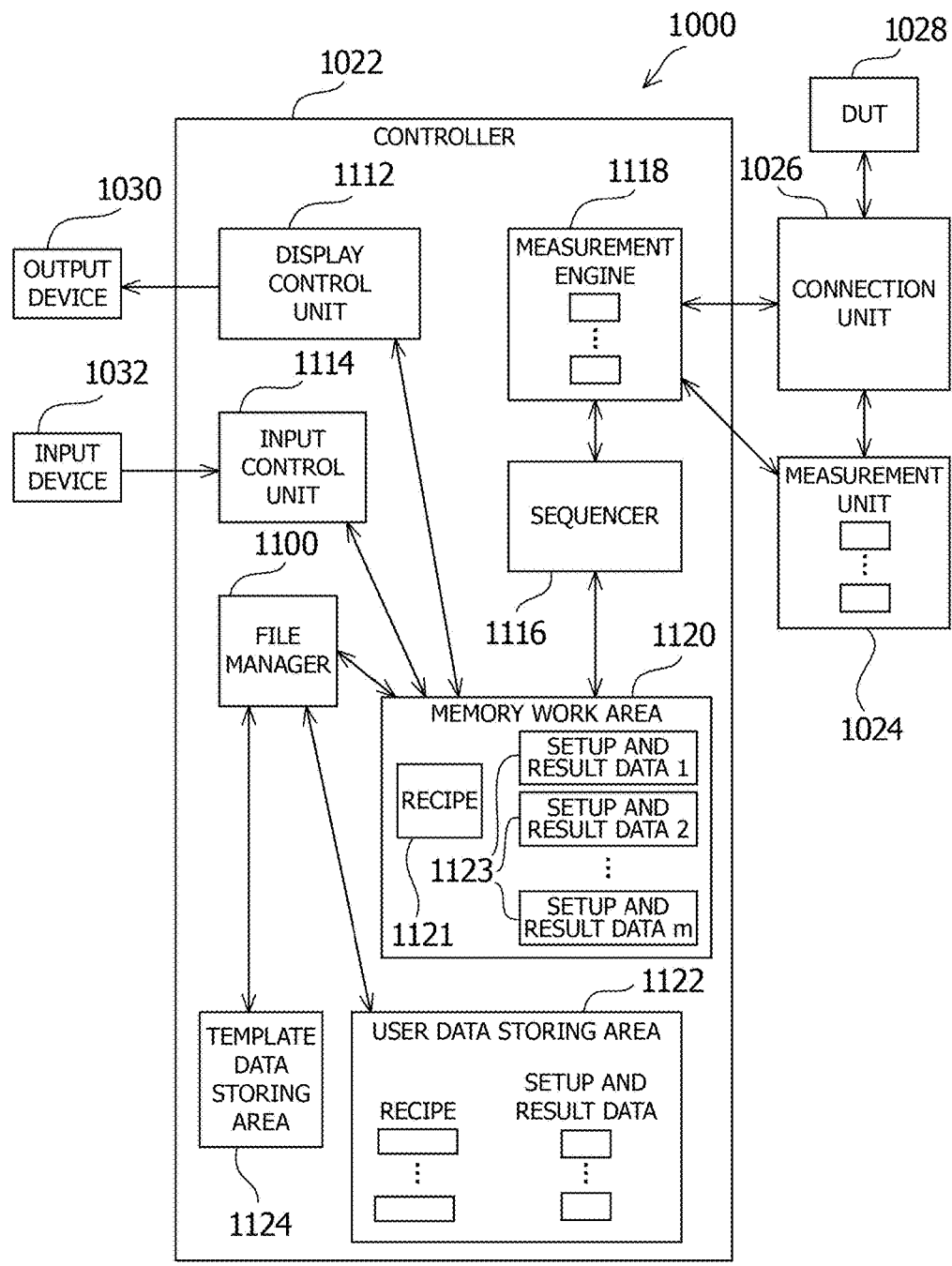
FIG. 10 is a block diagram for illustrating control conducted when the flowchart of FIG. 3 is executed by the apparatus illustrated in FIG. 9.

In the apparatus 1000 illustrated in FIG. 10, the controller 1022 includes an input controller 1114, a display controller 1112, a memory work area 1120, a sequencer 1116, a measurement engine 1118, a file manager 1100, a template data storing area 1124, and a user data storing area 1122.

The memory work area 1120 is a memory area used by a program being executed, and includes a single recipe 1121 and a plurality of sets of setup and result data 1123 to which reference is made within the recipe 1121. The memory work area 1120 may include a memory or an area for storing a program (not shown) required for the operation according to this embodiment. In addition, the memory work area 1120 may include a memory or an area for storing other data required for the operation according to this embodiment.

Figure 11A:
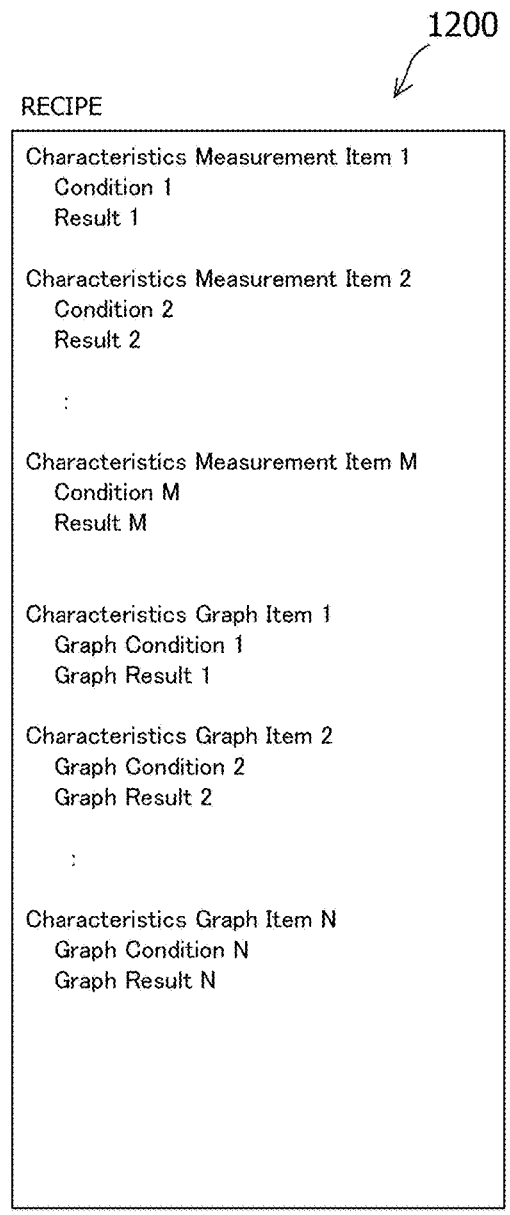
FIG. 11A is a diagram for schematically illustrating details of a recipe illustrated in FIG. 10.

In this case, the word "recipe" represents a part of a program having a high abstraction degree and including a description corresponding to the details displayed in FIG. 2A, FIG. 2B, and FIG. 2C. For example, the recipe 1200 in FIG. 11A is illustrated as a part corresponding to the display sections 106 and 108 shown in FIG. 2A, FIG. 2B, and FIG. 2C. In this case, the recipe 1200 includes a description part indicated by "Characteristics Measurement Item" for defining a measurement function name corresponding to the item name, a part indicated by "Condition" for describing the measurement condition, and a part indicated by "Result" for describing a definition of passing of the measurement result, in correspondence with each of the characteristic parameter items within the display section 106. In addition, the recipe

1200 includes a description part indicated by "Characteristics Graph Item" for defining a measurement function name corresponding to the item name, a part indicated by "Graph Condition" for describing the measurement condition, and a part indicated by "Graph Result" for describing a definition of passing of the measurement result, in correspondence with each characteristic graph item within the display section 108. Note that, the recipe 1200 may be formed of at least one of the description part indicated by "Characteristics Measurement Item" and the description part indicated by "Characteristics Graph Item." Notably, FIG. 11A is a schematic diagram that illustrates a main part of the recipe, but is not limited thereto. Detailed settings, such as those displayed in FIG. 2A, FIG. 2B, and FIG. 2C, and a correspondence relationships in the display may also be described in the recipe.

Figure 11B:
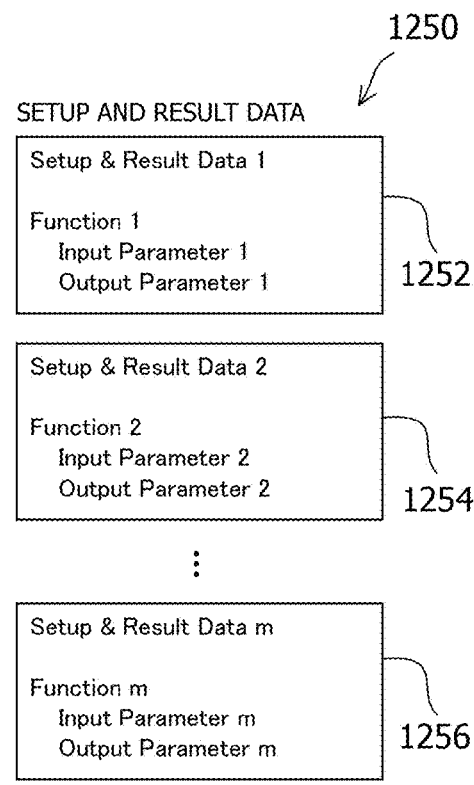
FIG. 11B is a diagram for schematically illustrating details of setup and result data illustrated in FIG. 10.

The setup and result data 1250 illustrated in FIG. 11B is a part of a program having a lower abstraction degree than the recipe 1200, and is divided into multiple representative parts 1252, 1254, and 1256. The parts 1252, 1254, and 1256 of the setup and result data 1250 each include information corresponding to any one of the description parts indicated by "Characteristics Measurement Item" or any one of the description parts indicated by "Characteristics Graph Item" within the recipe 1200, the information including a part indicated by "Function" that is a function name, a part indicated by "Input Parameter" that describes a definition of passing of an input parameter within the "Function," and a part indicated by "Output Parameter" that describes a definition of passing of an output parameter within the "Function." In this case, each "Function" may correspond, for example, to any one of a plurality of hardware drive libraries within the measurement engine 1118 in FIG. 10.

For example, the actual measurement function name of the first item "BVDSS" in the characteristic parameter display section 106 of FIG. 2A is described in "Characteristics Measurement Item 1" within the recipe 1200, the description corresponding to the measurement condition described in the field 218 (FIG. 2A) is described in "Condition 1" (FIG. 11A), and the definition of the passing of the measurement result described in the column 212 for "BVDSS" is described in "Result 1." In addition, the function name described in "Characteristics Measurement Item 1" within the recipe 1200 corresponds to, for example, a name of "Function 1" within the part 1252 indicated by "Setup & Result Data 1" of the setup and result data 1250 (FIG. 11B), "Condition 1" corresponds to the definition "Input Parameter 1" of the passing of the measurement condition in "Function 1," and "Result 1" corresponds to the definition "Output Parameter 1" of the passing of the measurement result in "Function 1."

Again with reference to FIG. 10, at the time of the execution of the measurement, the sequencer 1116 reads and interprets the details of the recipe within the memory work area 1120, and finds out the definition of the function corresponding to the characteristic parameter item or the characteristic graph item to be executed from the setup and result data. Subsequently, in accordance with the found definition of the function within the setup and result data, the sequencer 1116 executes the function within the setup and result data by associating the definitions of "Condition" and "Result" described in the recipe with "Input Parameter" and "Output Parameter." When the sequencer 1116 executes the function within the setup and result data, a corresponding library is called from among the plurality of hardware drive libraries stored in the measurement engine 1118 to control the hardware of the measurement unit 1024 and the connection unit 1026 and execute the measurement for the DUT 1028, to thereby acquire the measurement result. The sequencer 1116 receives the measurement result from the measurement engine 1118 as the measurement result corresponding to the recipe by referring to the corresponding definition within the setup and result data. The display control unit 1112 updates the output device 1030 based on the measurement result stored in the memory work area 1120, or outputs the measurement result to the output device 1030.

Note that, when the initial screen of the GUI having the data sheet format corresponding to the device type selected in Step 302 (FIG. 3) is displayed, the recipe 1121 and the setup and result data 1123 within the memory work area 1120 are loaded from the template data storing area 1124 into the memory work area 1120 through the file manager 1100.

Furthermore, in Step 304 and Step 308 of FIG. 3, the user is able to load the recipe stored in the past and the setup and result data relating thereto from the user data storing area 1122 into the memory work area 1120 through the file manager 1100. Furthermore, in Step 304, the user is able to store the current recipe and the current setup and result data within the memory work area 1120 into the user data storing area 1122 through the file manager 1100.

Furthermore, the stored data may be reused as a template for a device of the same type or a device of a similar type.

In addition, the various embodiments may be implemented as a tangible, non-transitory computer-readable recording medium having recorded thereon a program or instructions for executing any one of the methods being executed on a computer, such as a controller and/or processor As described above, the various embodiments enable the measurement condition for the characteristic parameter to be set to a desired setting, and the measurement result to be acquired, for the device to be measured with the data sheet format displayed from the beginning, and further enables the measurement condition for the characteristic graph to be set to a desired setting, and the measurement result to be acquired.

With this configuration, in regard to the device to be measured, after causing the expected measurement result to be displayed in the data sheet format from the beginning for the characteristic parameter or the characteristic graph with a desired setting relating to the circuit to be designed by the user, the user is able to edit the display, execute the measurement, reflect the measurement result, and examine the details thereof.

Accordingly, the user may interactively conduct a series of operations on the display having the data sheet format that is a format close to final results from the beginning. Hence, the embodiments provide excellent readability, particularly for a user who specializes in circuit design, and allow images of intended work and products thereof to be repeatedly and easily grasped from the display. This enables the measurement results for the characteristics of the device useful for circuit design to be obtained with efficiency and ease.

Furthermore, the embodiments enable the user to conduct comparative examinations, e.g., when noticing the need to measure another desired parameter with another setting value after viewing the measurement result or the characteristic graph for a desired characteristic parameter, by adding a measurement result or a graph thereof for the another desired parameter. This allows the device relating to the user's circuit design to be evaluated with efficiency.

Furthermore, the embodiments enable the characteristic parameter items or the characteristic graph items on the initial screen displayed after the type of the device to be measured is selected to be provided so as to completely cover the characteristic parameter items or the characteristic graph items described in the published data sheet of the device. This eliminates the need for the user to build a measurement environment and a measurement program with a full understanding of an application note of the device, and enables the user to easily progress with the work simply by selecting provided options. This may alleviate such labor of the user.

Notably, the embodiments enable the user to set a measurement condition that is not main or does not usually require a setting change, other than the measurement conditions that can be set for the characteristic parameter item or the characteristic graph item on the screen. This may be accomplished by opening a screen of the setup and result data relating to a subprogram at a level closer to that of hardware. The user may thus efficiently proceed with setting work for the measurement conditions on the screen having the data sheet format without diverting attention to the display of the measurement condition that is not main, and easily change the measurement condition that is not main, even when the need for the setting thereof arises, through the setting based on the subprogram at the level closer to that of hardware.

Furthermore, the user is able to add a measurement program corresponding to the characteristic parameter item or the characteristic graph item, or a measurement subprogram corresponding to the setup and result data by the user, as necessary.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. A method of evaluating an electronic device, comprising:
    displaying on a graphical user interface (GUI) a characteristic parameter item or a characteristic graph item of the electronic device in a data sheet format;
    editing the characteristic parameter item or the characteristic graph item in response to input received via the GUI; and
    providing a button displayed on the GUI that enables initiating execution of a measurement of the characteristic parameter item or the characteristic graph item in accordance with the editing of the characteristic parameter item or the characteristic graph item.

2. The method according to claim 1, further comprising executing the measurement of the characteristic parameter item or the characteristic graph item in response to selection of the button.

3. The method according to claim 1, further comprising displaying a measurement result for the characteristic parameter item or the characteristic graph item in the data sheet format.

4. The method according to claim 2, further comprising displaying a measurement result for the characteristic parameter item or the characteristic graph item in the data sheet format.

5. The method according to claim 1, wherein the characteristic parameter item to be displayed in the data sheet format comprises:
    a name for identifying the characteristic parameter item;
    a measurement condition for the characteristic parameter item; and
    a characteristic parameter value of the characteristic parameter item, or
    wherein the characteristic graph item to be displayed in the data sheet format comprises:
    a name for identifying a characteristic graph of the characteristic graph item;
    a measurement condition for the characteristic graph item; and
    the characteristic graph of the characteristic graph item.

6. The method according to claim 5, wherein the characteristic parameter item to be displayed in the data sheet format further comprises at least one boundary value that specifies a range of the characteristic parameter item that is assumable by a non-defective device.

7. The method according to claim 1, wherein the displaying the characteristic parameter item or the characteristic graph item in a data sheet format comprises:
    displaying a predetermined sample value as a parameter value of the characteristic parameter item; or
    displaying a predetermined sample graph as display of the characteristic graph item.

8. The method according to claim 7, wherein the display of the predetermined sample value or the display of the predetermined sample graph is for promoting a user's understanding of details of the execution of the measurement of the characteristic parameter item or the characteristic graph item without the execution of the measurement.

9. The method according to claim 1, further comprising acquiring, before the displaying the characteristic parameter item or the characteristic graph item in a data sheet format, a type of the electronic device and selecting data which is to be displayed in the data sheet format and which is suitable for the type of electronic device.

10. An apparatus for evaluating an electronic device under test (DUT), comprising:
    a measurement unit comprising a plurality of measurement modules;
    a connection unit configured to establish a connection between the DUT and at least one of the plurality of measurement modules;
    a screen configured to display a characteristic parameter display section or a characteristic graph display section; and
    a controller programmed to:
        control a display on the screen including the characteristic parameter display section for displaying a characteristic parameter item corresponding to the DUT in a data sheet format or the characteristic graph display section for displaying a characteristic graph item corresponding to the DUT in the data sheet format;
        edit details of the displayed characteristic parameter display section or the displayed characteristic graph display section in response to an input;
        execute a measurement based on the edited details; and
        control a display on the screen of a result of the measurement in the characteristic parameter display section or the characteristic graph display section in the data sheet format.

11. The apparatus according to claim 10,
    wherein the characteristic parameter item to be displayed in the data sheet format comprises:
    a name for identifying the characteristic parameter item;

a measurement condition for the characteristic parameter item; and
a value of the characteristic parameter item, or
wherein the characteristic graph item to be displayed in the data sheet format comprises:
a name for identifying the characteristic graph item;
a measurement condition for the characteristic graph item; and
the characteristic graph item.

12. The apparatus according to claim 11, wherein the characteristic parameter item to be displayed in the data sheet format further comprises at least one boundary value that specifies a range of the characteristic parameter value that is assumable by a non-defective device.

13. The apparatus according to claim 11, wherein the characteristic parameter display section or the characteristic graph display section displays, before the execution of the measurement:
a predetermined sample value as a parameter value of the characteristic parameter item; or
a predetermined sample graph as display of the characteristic graph item.

14. The apparatus according to claim 10, wherein the plurality of measurement modules of the measurement unit comprise at least one of a voltage source, a current source, an ammeter, a voltmeter, a source measure unit, an impedance meter, and a capacitance meter.

15. The apparatus according to claim 10, further comprising an input device for receiving input to operate the apparatus.

16. The apparatus according to claim 10, wherein the controller comprises:
a recipe corresponding to details of the characteristic parameter display section or the characteristic graph display section;
a plurality of sets of setup and result data; and
a sequencer configured to control the measurement unit based on the recipe and the plurality of sets of setup and result data.

17. The apparatus according to claim 13, wherein the display of the predetermined sample value or the display of the predetermined sample graph is for promoting a user's understanding of details of the execution of the measurement of the characteristic parameter item or the characteristic graph item without the execution of the measurement.

18. The apparatus according to claim 10, wherein the controller is further programmed to acquire a type of the DUT, and to thereby select data to be displayed in the characteristic parameter display section or the characteristic graph display section in the data sheet format according the type of the DUT.

19. A non-transitory computer-readable recording medium, storing instructions executable by a computer processor, causing the computer processor to execute a method comprising:
displaying a characteristic parameter item or a characteristic graph item in a data sheet format on a graphical user interface (GUI);
editing the characteristic parameter item or the characteristic graph item displayed in the data sheet format in response to user input via the GUI; and
initiating a measurement of the edited characteristic parameter item or the edited characteristic graph item in response to selection of a button displayed on the GUI.

20. The computer-readable recording medium according to claim 19, wherein the instructions further cause the computer processor to execute the method further comprising displaying a measurement result for the characteristic parameter item or the characteristic graph item in the data sheet format.

* * * * *